United States Patent [19]

Miyazaki

[11] E Patent Number: Re. 32,005

[45] Reissued Date of Patent: Oct. 15, 1985

[54] MAGNETIC ALLOY HAVING A LOW MELTING POINT

[75] Inventor: Takeshi Miyazaki, Omiya, Japan

[73] Assignee: Hitachi Metals, Ltd., Tokyo, Japan

[21] Appl. No.: 419,507

[22] Filed: Sep. 17, 1982

Related U.S. Patent Documents

Reissue of:

[64] Patent No.: 4,239,533
Issued: Dec. 16, 1980
Appl. No.: 904,321
Filed: May 9, 1978

[30] Foreign Application Priority Data

Feb. 6, 1978 [JP] Japan ..... 53-12206

[51] Int. Cl.[4] ..... C22C 5/04; C22C 30/00

[52] U.S. Cl. ..... 148/31.55; 420/463; 420/580

[58] Field of Search ..... 148/430, 442, 31.55, 148/31.57, 100, 101; 420/456, 441, 442, 444, 463, 435, 464, 465, 585, 587, 588, 580

[56] References Cited

U.S. PATENT DOCUMENTS

| | | | |
|---|---|---|---|
| 1,832,307 | 11/1931 | Kingsbury | 420/456 |
| 1,999,865 | 4/1935 | Capillon et al | 420/465 |
| 3,497,332 | 2/1970 | Donnelly et al | 420/463 |
| 3,928,913 | 12/1975 | Schaffer | 420/463 |
| 4,061,495 | 12/1977 | Selman et al | 420/444 |

FOREIGN PATENT DOCUMENTS

| | | | |
|---|---|---|---|
| 2039100 | 1/1973 | Fed. Rep. of Germany | 420/463 |

OTHER PUBLICATIONS

Metals Abstracts, "NMR Study in Pd-Co and Pd-Co-Ni Alloys", 76-11, 15-2152, Nov. 1976, p. 1840.

Katayama et al., "NMR Study in PdCo and PdNiCo Alloys", Journal of the Physical Society of Japan, vol. 40, No. 2, Feb. 1976, pp. 429-434.

*Primary Examiner*—Peter K. Skiff

*Attorney, Agent, or Firm*—Antonelli, Terry & Wands

[57] ABSTRACT

A magnetic alloy having a relatively low melting point, particularly for dental use.

The low melting point magnet alloy contains one or more elements of Co and Ni, a Co content of which being in the range of 79 wt. % or less, a Ni content being in the range of 80 wt. % or less, the remainder being essentially a Pd content.

4 Claims, No Drawings

MAGNETIC ALLOY HAVING A LOW MELTING POINT

Matter enclosed in heavy brackets [ ] appears in the original patent but forms no part of this reissue specification; matter printed in italics indicates the additions made by reissue.

BACKGROUND OF THE INVENTION

The present invention relates in general to a magnetic alloy, and more particularly to a magnetic alloy having a relatively low melting point such as 1350 degrees in C or lower and a good resistance to corrosion, and having a magnetic property such that its magnetic flux density value $B_{100}$ is 2000 G or higher when it is subjected to an external magnetic field of 100 G.

Magnet alloys have a variety of applications in practice, and therefore, there have been developed a various number of magnet alloys which are, respectively, suitable for varied applications. With respect to the melting point of such magnet alloys, the conventional magnet alloys have relatively high melting points, for instance, a silicon steel and a permalloy-family alloy, both of which are generally known as high magnetic permeability alloys, have such melting points of about 1500° and 1450° C., respectively. Consequently, in order to melt and cast such magnet alloys such means as a high frequency furnace, an electric arc furnace or the like is used. Actually, there has been a strong demand for magnet alloy having a still lower melting point which can be processed for melting and casting with much greater ease, but there has not been developed any of such alloys as yet. As a typical use of such magnet alloys which can readily and conveniently be melted and cast, there are, for example, a relatively small quantity of magnet alloy to be used in a laboratory for experimental purposes by using a very simple furnace unit or the like which uses such a widely used fuel as city gas or the city gas plus oxygen, or the preparation of alloys for dental use by using ordinary type melting equipment such as owned by dentists or dental technicians, etc.

The average melting point of such alloys which can be melted and processed by such common furnaces using such fuels as city gas plus oxygen is typically about 1300° C. or lower though it may vary depending upon the type and construction of such furnaces. With a small-sized furnace of high frequency type, particularly of a high performance type, it is practicably possible to melt such alloys having a melting point of 1400° C. or higher. However, usually, melting of such alloy is carried out in an open atmosphere and therefore, melting work of a small quantity of material is preferably carried out in a period of time as short as possible. Therefore, the provision of an alloy that can be processed at such a relatively low temperature as 1350° C. or lower will make it easier to attain the object as stated above. In this respect, there has long been a strong desire for the advent of such useful magnet alloy having a melting point of at most 1350° C. or lower, or more preferably 1300° C. or lower. For use as an acceptable magnet alloy, it is essential that such an alloy should have a saturated magnetic flux density of 2000 G or higher as a minimum, and in addition, for the dental use it is essential that such an alloy should have a superior resistance to corrosion. As for a specific use, such an alloy is required to be satisfactory for porcelain coating.

SUMMARY OF THE INVENTION

Therefore, it is a primary object of the present invention to provide an improved and useful magnet alloy having such a relatively low melting point as 1350° C. or lower and a sufficient resistance to corrosion, and further having a saturated magnetic flux density of 2000 G or higher.

According to the present invention, briefly summarized by way of a preferred embodiment thereof, there is provided an improved magnet alloy consisting essentially of at least one or more of the elements selected from the group consisting of less than 79 wt. % of Co, *e.g., 20–36 wt. % Co,* and less than 80 wt. % of Ni, *e.g., 29–45 wt. % Ni,* and the remainder being essentially Pd.

Further objects and advantageous features of the present invention will become more apparent when read the following detailed description by way of a preferred embodiment thereof.

DETAILED DESCRIPTION OF THE PREFERRED EMBODIMENT

Description will now be given in detail on preferred embodiments of an improved and useful magnet alloy according to the present invention.

A magnet alloy represented by 43% Pd-57% Co was melted and cast at a melting temperature (TM) of 1240° C. by using the ordinary city gas as a furnace fuel. The magnetic and physical properties of this cast alloy were tested, and the results of such test are as given in Table 1.

As typically shown in Table 1, the tested alloy exhibited the magnetic flux density $B_{100}$ of 10000 G, the Hc value of 5.8 Oe, when it was subjected to an external magnetic field of 100 Oe and the alloy shows Vickers' hardness Hv of 125. No appreciable change in color was observed, nor any other appreciable change after it was immersed and kept in a 1 wt. % aqueous solution of $Na_2S$ for a period of 24 hours. When the alloy specimen consisting essentially of 43.5 wt. % of Pd and 56.5 wt. % of Ni was melted and cast by using the normal city gas as a fuel, the melting temperature TM was 1280° C., and its magnetic and physical properties tested are shown in Table 1. The alloy exhibited the magnetic flux density $B_{100}$ of 3900 G, and the Hc value of 3.3 Oe, when it was subjected to the external magnetic field of 100 Oe. There was no appreciable change in color or any other change observed during the immersion test where the alloy was immersed in a 1 wt. % aqueous solution of $Na_2S$ for a period of 24 hours.

A series of tests were conducted on alloys having different constituent elements, and the results are shown in Table 1. The observation with substantially no color change in the immersion test using a 1 wt. % aqueous solution of $Na_2S$ was similarly good with any of these alloys under test.

TABLE 1

| | Chemical Composition (wt. %) | | | | TM | Magnetic Property | |
|---|---|---|---|---|---|---|---|
| No | Pd | Co | Ni | Other Additives | (°C.) | $B_{100}$ (G) | Hc (Oe) |
| 1 | 43 | 57 | | | 1,240 | 10,000 | 5.8 |
| 2 | 41 | 54 | | Cr 5 | 1,270 | 7,300 | 5.9 |
| 3 | 43 | 47 | | Fe 10 | 1,260 | 11,100 | 6.3 |
| 4 | 43 | 53 | | Cu 4 | 1,230 | 6,800 | 11.0 |
| 5 | 45 | 51 | | Mn 3, Zn 1 | 1,240 | 6,800 | 9.5 |
| 6 | 45 | 48 | | Pt 5, Sn 2 | 1,230 | 6,100 | 15.2 |
| 7 | 43 | 53 | | Au 3, Ag 1 | 1,230 | 6,900 | 18.5 |

TABLE I-continued

| No | Chemical Composition (wt. %) Pd | Co | Ni | Other Additives | TM (°C) | Magnetic Property $B_{100}$ (G) | Hc (Oe) |
|---|---|---|---|---|---|---|---|
| 8 | 35 | 54 | | Cu 8, Cr 3 | 1,240 | 5,300 | 11.0 |
| 9 | 35 | 52 | | Fe 10, Cr 3 | 1,290 | 9,500 | 8.5 |
| 10 | 43.5 | | 56.5 | | 1,250 | 3,900 | 3.3 |
| 11 | 40.3 | | 52.4 | Cr 7.3 | 1,230 | 2,700 | 7.8 |
| 12 | 36.5 | | 47.4 | Fe 16.1 | 1,220 | 11,400 | 1.2 |
| 13 | 42.8 | | 53.7 | Al 3.5 | 1,150 | 2,600 | 16.5 |
| 14 | 43 | 42 | 15 | | 1,200 | 8,200 | 5.5 |
| 15 | 43.5 | 27.4 | 21.9 | | 1,190 | 7,200 | 5.6 |
| 16 | 38.2 | 28.4 | 30.2 | Cr 3.2 | 1,180 | 6,500 | 5.4 |
| 17 | 37.1 | 8.3 | 41.3 | Cu 13.3 | 1,140 | 2,800 | 2.8 |
| 18 | 47.3 | 13.2 | 26.3 | Cr 8.3, Cu 9.4 | 1,120 | 4,600 | 4.7 |
| 19 | 42.8 | 28.0 | 28.0 | Al 1.2 | 1,210 | 5,100 | 11.3 |
| 20 | 38.7 | 17.1 | 31.9 | Pt 12.3 | 1,280 | 5,900 | 8.3 |
| 21 | 35.1 | 7.0 | 37.0 | Au 21.0 | 1,170 | 4,300 | 16.2 |
| 22 | 37.9 | 21.8 | 23.9 | Mn 16.4 | 1,100 | 7,300 | 6.4 |

Although the content of Co, in the magnet alloy according to the present invention, was found to be effective to bring an improvement in resistance to corrosion and also to an increase of hardness of an alloy, if the Co content exceeds 79 wt. %, there was observed excessive precipitation of the Co content so it must be kept less than 79%. In order to keep the melting point of the alloy at 1350° C. or lower, it was found advantageous in practice to keep the range of the Co content from 20 to 70 wt. %. A magnet alloy could be made further stable in its resistance against corrosion by preparing it with a Pd alloy content. *Another preferred range of Co is 7-50 wt. %.*

An Ni content in the order of 80 wt. % or lower in the magnet alloy according to this invention is an essential condition for rendering the melting temperature 1350° C. or lower, and by preparing the allow with a Pd content, it was possible to make the alloy excellent in corrosion resistance. *Another preferred range of Ni is 15-58 wt. % when, e.g., the range of Co is 7-50 wt. %.*

Though it was generally known that an addition of Cr would bring an improvement in corrosion resistance and an increase of hardness of an alloy, it makes the magnetic flux density and castability of an alloy substantially very poor if the Cr content exceeds the level of 15 wt. %. In this respect, it is necessary in practice to keep the Cr content less than 15 wt. %, more preferably 7 wt. % or less. Moreover, an Ni/Pd alloy according to this invention including only a small amount of Cr was found to have an excellent capability for porcelain coating.

Fe in the alloy has an effect to improve a magnetic flux density and to slightly increase the hardness of the alloy, but if the Fe content exceeds the order of 30 wt. %, this would bring an adverse effect to have its corrosion resistance remarkably deteriorated, and also to increase its melting point. In this consideration, it is preferred to keep the Fe content 30 wt. % or less, more preferably 18 wt. % or less.

Though a Cu substantially contributes to an increased hardness of an alloy, if it exceeds 20 wt. %, this would result in a very poor magnetic flux density, therefore, it is preferrable to have the Fe content in the order of 20 wt. % or less, more preferably 10 wt. % or less.

An Al content in the order of 10 wt. % or less will bring a substantial increase in hardness of an alloy. If the Al content is too high, this would make the magnetic flux density $B_{100}$ with application of an external 100 Oe field substantially lower, and bring a poor castability. In the practice of this invention, an alloy containing Ni yet including only a small quantity of Al was found to have an excellent capability of porcelain coating.

Pt may be added in the order of 20 wt. % or less in order to attain an increase in a hardness and an improvement in a corrosion resistance of the alloy, but as this would also effect a substantial reduction of a magnetic flux density thereof, it is preferred to have the Pt content in the order of 8 wt. %.

Au will contribute substantially to an improvement in corrosion resistance, but if it exceeds the order of 30 wt. %, there occurs a precipitation of the secondary phase, thus resulting in brittleness. In this respect, it is preferred to have the Au content in the order of 23 wt. % or less.

Sn, Zn and Cd will contribute to a substantial increase in a hardness and an improvement in a castability, yet bring poor mechanical properties. In this consideration, these additives were kept in the order of 3 wt. % or less, respectively.

Mn effects an increase of a hardness of the alloy, but an excessive content would cause a drastic reduction in magnetic flux density thereof.

Ag content will effect substantially an increase in hardness, contribute to a minor improvement in corrosion resistance, and bring a slightly lower melting point of the alloy, but substantially reducing a magnetic flux density. Therefore, the Ag content was kept in the order of 3 wt. % or less.

In the practice of the present invention, for the purpose of increasing the hardness of an alloy, one or more of the elements selected from the group consisting of Nb, Ti, V, Si, Mg and Hf may be added in only small amounts. Also, such elements as Mo, W and Ta are effective to obtain increase in a hardness of the alloy according to this invention.

As fully explained hereinbefore, according to the present invention, there are presented the useful and improved magnet alloys having a relatively low melting point which can be applied to the laboratory use or to the dental use by virtue of their advantageous feature, i.e., these magnet alloys can be handled very easily in a melting and casting processing by using an ordinary furnace using fuel such as city gas and the like.

What is claimed is:

1. A magnet alloy which consists essentially of Co, Ni and Pd, the content of Co being in the range of from 20 to [70] *36* weight %, the content of Ni being in the range of 29 to [80] *45* weight %, and the content of Pd being at least 35 weight %, said alloy having a magnetic flux density value $B_{100}$ of at least 2000 G and a melting point of not more than 1350°. C.

2. A magnet alloy which consists essentially of Co, Ni, Pd and at least one additive element, the content of Co being 20 to [70] *36* weight %, the content of Ni being in the range of 29 to [80] *45* weight %, the content of Pd being at least 35 weight % and the at least one additive element being selected from the group consisting of 15 weight % or less Cr, 30 weight % or less Fe, 20 weight % or less Cu, 3 weight % or less Zn, 3 weight % or less Sn, 20 weight % or less Pt, 23 weight % or less Au and 3 weight % or less Ag, said alloy having a magnetic flux density value $B_{100}$ of at least 2000 G and a melting point of not more than 1350° C.

*3. A magnet alloy which consists of Co, Ni and Pd, and inevitable impurities, the content of Co being in the range of from 7 to 50 weight %, the content of Ni being in the*

*range of 15 to 58 weight %, and the content of Pd being at least 35 wt. %, the alloy having a magnetic flux density value $B_{100}$ of at least 2,000 G and a melting point of not more than 1350° C.*

*4. A magnet alloy which consists of Co, Ni, Pd, at least one additive element, and inevitable impurities, the content of Co being 7 to 50 weight %, the content of Ni being 15 to 58 weight %, the content of Pd being at least 35 weight % and the at least one additive element being selected from the group consisting of 15 weight % or less Cr, 30 weight % or less Fe, 20 weight % or less Cu, 3 weight % or less Zn, 20 weight % or less Pt, 23 weight % or less Au and 3 weight % or less Ag, the alloy having a magnetic flux density value $B_{100}$ of at least 2,000 G and a melting point of not more than 1350° C.*

* * * * *